United States Patent [19]

Stevenson et al.

[11] Patent Number: 5,118,086
[45] Date of Patent: Jun. 2, 1992

[54] ELASTOMERIC SPRING WITH NON-LINEAR FORCE/DEFLECTION CHARACTERISTICS

[75] Inventors: Andrew Stevenson; John Harris, both of Hertfordshire, England

[73] Assignee: Material Engineering Research Laboratory Ltd., Hertford, England

[21] Appl. No.: 475,960

[22] Filed: Feb. 6, 1990

[30] Foreign Application Priority Data

Aug. 25, 1989 [GB] United Kingdom ............... 8919338

[51] Int. Cl.⁵ .................. F16F 9/10; B60G 11/62
[52] U.S. Cl. ............................. 267/70; 267/35; 267/141.1
[58] Field of Search ............ 267/35, 70, 141.1, 141.3, 267/141.8, 153, 292, 293, 294, 140.4, 141

[56] References Cited

U.S. PATENT DOCUMENTS

| | | | |
|---|---|---|---|
| 3,118,659 | 1/1964 | Paulsen | 267/153 X |
| 3,202,412 | 8/1965 | Trask | 267/153 X |
| 3,305,227 | 2/1967 | Henley | 267/141 X |
| 3,315,951 | 4/1967 | Boschi et al. | 267/153 |
| 3,368,806 | 2/1968 | Szonn | 267/153 |
| 3,606,295 | 9/1971 | Appleton | 267/14.1 X |
| 3,625,501 | 12/1971 | Hein et al. | 267/153 |
| 4,355,792 | 10/1982 | Fukada et al. | 267/153 |

FOREIGN PATENT DOCUMENTS

| | | | |
|---|---|---|---|
| 1255720 | 1/1961 | France | 267/153 |
| 838175 | 6/1981 | U.S.S.R. | 267/140.4 |
| 759423 | 10/1956 | United Kingdom | 267/153 |
| 1008912 | 11/1965 | United Kingdom | 267/153 |
| 1066745 | 4/1967 | United Kingdom | 267/153 |

Primary Examiner—Robert J. Oberleitner
Assistant Examiner—Alfred Muratori
Attorney, Agent, or Firm—Pollock, Vande Sande & Priddy

[57] ABSTRACT

A compression spring useful in vehicle suspension applications has an extended plateau region in its force/deflection characteristics, such extended plateau being obtained by virtue of the formation of the spring as a tubular elastomer body of progressively increasing cross-section from one end to the other provided with longitudinally spaced-apart reinforcements defining bulging instability sites therebetween. The spring when under compression undergoes bulging sequentially at these sites.

32 Claims, 8 Drawing Sheets

Enhanced "Geometric" damping at plateau (point 2)

STATIC OFFSET: X:5mm o:7mm *:8.7mm V:10.4 ☆:13mm

ELASTOMERIC SPRING WITH NON-LINEAR FORCE/DEFLECTION CHARACTERISTICS

FIELD OF THE INVENTION

This invention concerns improvements in and relating to elastomeric springs and particularly, though not exclusively, is concerned with the application of such springs to the field of vehicular suspension.

BACKGROUND OF THE INVENTION

There have been many proposals in the prior art to utilize the properties of elastomeric materials in the design of shock absorption devices for vehicle suspensions, the earliest of such proposals concentrating upon utilization of natural rubber elastomers and more recent proposals making use of the advantageous characteristics of modern synthetic elastomeric materials. The prior art proposals have also embraced the use of elastomeric materials in conjunction with metal and other spring devices in so-called composite springs and, as will be explained hereinafter, the present invention also embraces this possibility.

Elastomers have been used for many years as anti-vibration components in the suspension systems of automobiles and other vehicles. Modern automobiles may contain more than a dozen different components such as bushes, mounts, etc. Primary suspension is still usually a conventional steel spring with a hydraulic damper, the system often incorporating an elastomeric top mount. Elastomeric components are widely used in anti-vibration systems in automobiles and other ground vehicles as well as aerospace applications. They can combine low spring rates with low or high damping to attenuate vibration. The ability to attenuate vibrations will in general depend on both the amplitude and frequency of the input vibration. Thus, although vibration isolation or damping may be very successful for one source condition, it may be quite ineffective for another source condition. It is a feature of vehicles that a large number of different vibrations from different sources will often be simultaneously superimposed.

Current design procedures for elastomeric anti-vibration devices are usually a compromise aimed at dealing with the worst of the vibrations. Isolation of vibrations is always preferable if natural frequencies of resonance can be made low enough compared to the input frequencies. This often cannot be ensured when dealing with a spectrum of inputs, especially with conventionally designed anti-vibration mounts. Damping is then required to reduce resonant effects (or impact responses), but usually at the expense of isolation of higher frequencies. Design needs to balance these two functions. In addition, design is usually based on an approximation to linear materials behivor although it is well known that elastomers have non-linear static and dynamic force deflection behivor.

One reason that elastomers have not been more extensively used as primary suspension components is that engineers are generally unfamiliar with non-linear, materials and so designs have tended to minimize non-linear aspects, to the detriment of exploiting the full potential of elastomeric components.

Described in European Patent Application No. 85115879 (Ser. No. EP-A2-0184848) is a composite spring comprising a tubular elastomeric body, preferably of rubber, having a coil spring embedded in and bonded to it; the coil spring is said to control the occurrence of symmetric bulging instability in the elastomeric body under axial load conditions so that this bulging instability occurs sequentially along the length of the body between adjacent coils of the coil spring until it assumes the form of a continuous coil of elastomer. By virtue of this arrangement, the force/deflection characteristic of the composite spring is said to be controllable to provide selected stiff and soft regions in accordance with specific requirements, particularly the provision of a soft load bearing characteristic over an extended deflection range at a predetermined load, with the soft region corresponding to the symmetric bulging of the elastomer body. The application of such a composite spring device to automotive suspensions is further discussed in Rubber Chemistry and Technology, Vol. 59, No. 5, November-December 1986, pp. 740 to 764, in the article entitled "On the role of nonlinearity in the dynamic behavior of rubber components" by J. Harris and A. Stevenson, the inventors of the present invention.

While the force/deflection characteristic described in EP-A2-0184848 abovementioned has attractions for automotive suspension applications, it is our current belief that a composite spring device as described in EP-A2-0184848 may not be reliably and consistently capable of achieving characteristics significantly different from those obtained by much earlier and more recent prior art devices. In this connection, reference may be made to U.S. Pat. No. 1,032,454, issued in 1912 which discloses a rubber body within which there is embedded a helical spring. Other disclosures of composite springs comprising generally cylindrical elastomer bodies having helical springs embedded therein are shown in French Patent No. 34669 (patent of addition to FR-A-559350), issued in 1929, U.S. Pat. Nos. 2,156,580 issued in 1939, 2,605,099 issued in 1952, 2,822,165 issued in 1958, and European Patent No. EP-B1-0045497. A composite spring comprising a cylinder of elastomeric material having metal annuli embedded therein at spaced apart locations is described in European Patent No. EP-A1-0155209.

SUMMARY OF THE INVENTION

The present invention is based on the realization that, in order to reliably and consistently achieve a force/deflection characteristic of the kind described in EP-A2-0184848, it is necessary to positively constrain the elastomer body to buckle progressively in a predetermined manner by appropriately configuring the body and/or any composite materials associated therewith; the right cylindrical elastomer body described in EP-A2-0184848 with a helical spring embedded therein will not, it is believed, exhibit the sequentially occurring bulging instabilities required to produce the required force/deflection characteristics in a predetermined manner, as neither will any of the spring devices disclosed in any of the other prior art documents disclosed herein.

According to the present invention, in one of its aspects, there is therefore provided a compression spring comprising an elongate tubular elastomer body provided with longitudinally spaced-apart reinforcements defining therebetween sites for local bulging instabilities, and wherein the spring is constrained to develop such local bulging instabilities sequentially throughout said sites when under compressive load by virtue of the spring having a non-uniform cross section progressing from a lesser to a greater end of the spring.

In accordance with the teachings of this aspect of the present invention, therefore, an elastomeric body providing advantageous force/deflection characteristics might, for example, have a generally frusto-conical cylindrical shape such that the cross-section of the body changes progressively throughout its length, whereby sequential bulging of the body is assuredly and consistently a structural feature of the shape of the body. In one exemplary embodiment, a spring made entirely of elastomeric material has periodic annular reinforcements formed integrally in its wall so as further to predetermine the force/deflection characteristic of the spring by achievement of progressive bulging instabilities, and in another arrangement equivalent reinforcements are provided by means of reinforcing annuli spaced axially from one another, advantageously at progressively changing distances, the annuli being formed of metal or of any other suitable material capable of reinforcing the elastomer.

By virtue of the generally conical shape of the elastomer body (and it is to be noted that the present invention is not to be regarded as limited to strictly conical shapes nor to shapes of circular cross-section), a spring device is obtained which can be made to be stable overall at its design loading and yet demonstrates local buckling instabilities which come into effect progressively and in a predetermined manner so as to contribute to a non-linear static force/deflection behavior of specific type. In application of the spring device of the invention to a vehicle suspension, the non-linear spring function can advantageously be predetermined so that the normal static weight of the vehicle is supported in the plateau region of the non-linear force/deflection characteristic of the device, and the elastomer functions dynamically to provide substantial attenuation of vibration passing into the vehicle body while the vehicle is in motion.

Also described in the following, in connection with specific exemplary embodiments, are conical elastomer elements having a cone angle of from 2° to 28° and preferably from 5° to 15°. The elastomer elements incorporate annular reinforcing rings spaced apart axially of the conical elements and firmly bonded to the elastomeric material, the reinforcing rings preferably being simple flat metal pressings or simple circular section metal rings. Elastomeric springs in accordance with the invention can be formed of one and the same elastomeric material throughout, or alternatively, and in accordance with a preferred and advantageous feature, can be formed of different elastomeric materials having different deflection characteristics, so that the overall spring force/deflection characteristic is the aggregate of a plural number of different elemental characteristics selected according to the required application of the spring. By virtue of such a multiple elastomer spring construction, a spring exhibiting a plural number of plateaus in its force/deflection curve can be obtained which has advantageous application to vehicle suspension applications, for example where different vehicle loadings are to be accommodated. Multiple elastomer spring constructions in accordance with the invention can be integrally molded by use of molding dies having multiple injection ports and by controlling the injected elastomer flow paths in the dies, or alternatively can be formed by assembling together a plurality of preformed spring elements. Ideally, less than ten preformed spring elements would be thus assembled.

BRIEF DESCRIPTION OF THE DRAWINGS

Further features of the invention are set forth in the appended claims, and in order that the invention might be more clearly understood, several exemplary embodiments thereof will hereinafter be described with reference to the accompanying drawings.

Figure 1:
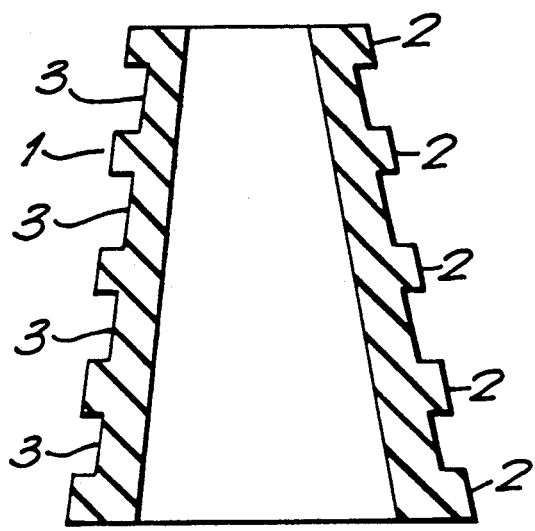
FIG. 1 is a cross-sectional view of a first embodiment of the invention shown in unloaded condition.
Figure 2:
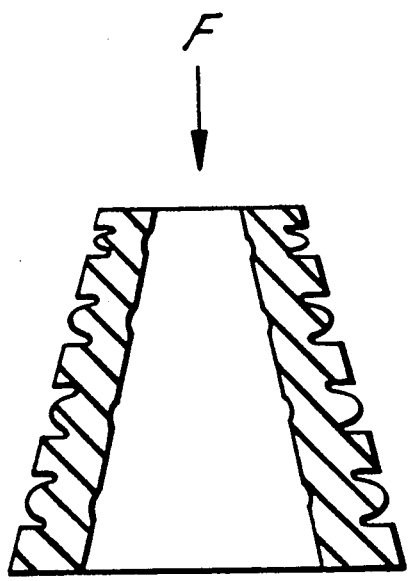
FIG. 2 is a view of the embodiment of FIG. 1 as axially compressed under the action of a force F.

DETAILED DESCRIPTION OF PREFERRED EMBODIMENTS:

Referring first to FIGS. 1 and 2, shown therein is an integrally-formed elastomeric spring device in accordance with the present invention comprising a molded hollow frusto-conical elastomer body 1 having annular reinforcing ribs 2 provided on its outer surface and defining therebetween sites 3 for the occurrence of bulging instabilities as the device is axially compressed. As shown in FIG. 1, the ribs 2 are equi-axially spaced apart from each other and are all of the same size and configuration, but they could alternatively be differently spaced from each other and/or they could be of different sizes so as to have different reinforcing effects upon the tendency of the body 1 to buckle and bulge outwardly under axial compression, the essence of the present invention being that bulging instabilities should be constrained by the structure of the device to occur in the elastomer body in a predetermined progressive manner. FIG. 2 shows the compression of the body 1 under axial loading and indicates how controlled sequential bulging will occur on account of the different diameters of the elastomer at the different sites 3.

Figure 3:
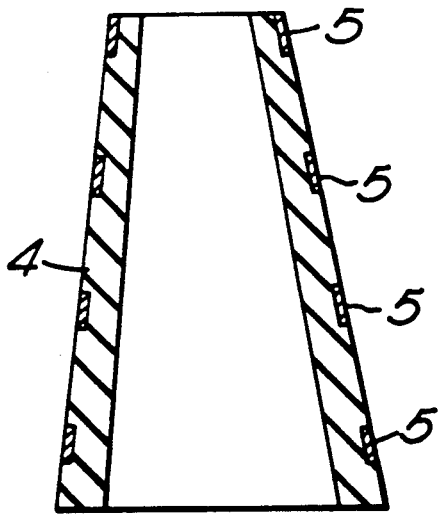
FIG. 3 shows a cross-sectional view of a second embodiment of the invention shown in unloaded condition.
Figure 4:
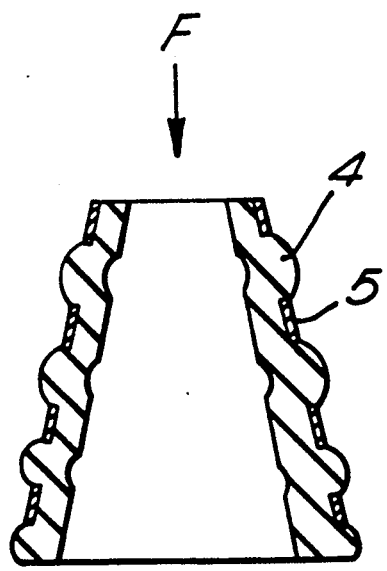
FIG. 4 shows the embodiment of FIG. 3 as axially compressed under the action of a force F.

Whereas the device of FIGS. 1 and 2 is integrally formed (though it need not be, the reinforcing rings 2 could be assembled to the device separately), the device of FIGS. 3 and 4 comprises an elastomer body 4 of hollow frusto-conical shape provided at axially spaced-apart locations with separately formed reinforcing rings 5 which might be formed of metal, for example, or could be formed of an appropriate rigid or semi-rigid plastic material, or could be formed by winding filamentary material onto the external surface of the elastomer body 5. As with the device of FIGS. 1 and 2, in the device of FIGS. 3 and 4 the rings need not be the same and could be formed in different shapes and sizes, and/or of different materials, and/or differently spaced apart from each other.

Many other variations of the devices of FIGS. 1 to 4 are possible within the ambit of the present invention. For example, the wall thickness of the conical elastomer body could be less at one axial end of the body than at the other so as to assist the formation of progressive bulging instabilities in the device under compression. The cone angle as a design parameter can also be varied, not only to ensure controlled sequential bulging, but also to adjust the stages in the force/deflection characteristic of the device at which bulging occurs. Helical, rather than annular, reinforcing ribs could be utilized, though annular ribs are presently preferred. Furthermore, while in the devices of FIGS. 1 to 4 the conical structure is such that buckling occurs outwardly, an equivalent device could be configured so that buckling occurs inwardly.

The elastomeric material of the elastomer body might be of natural or synthetic rubber, for example, or might be formed of a composite elastomer material exhibiting multi-phased behavior under compressive load conditions, and could possible incorporate magnetic material so as to enable controlled magnetic or electromagnetic damping of dynamic vibrations to be achieved. The internal void of the hollow elastomer body might further incorporate dynamic damping means, which might comprise a soft elastomeric filling material, such as vulcanized or unvulcanized polysulphide or a foamed plastic material, and/or might incorporate active or passive fluid damping components enabling the intrinsic transmissibility performance characteristics of the device to be adapted to the specific application.

Figure 5:
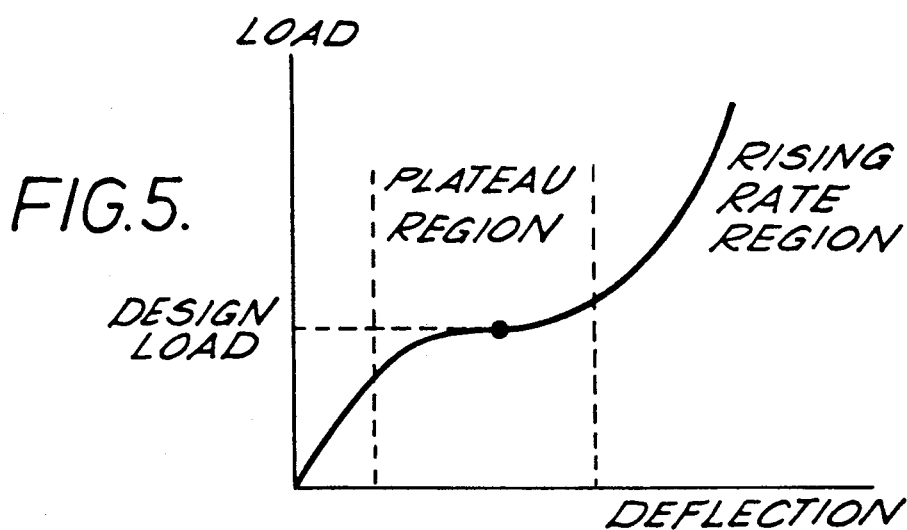
FIG. 5 shows the static load/deflection characteristic obtainable by virtue of the present invention.
Figure 6:
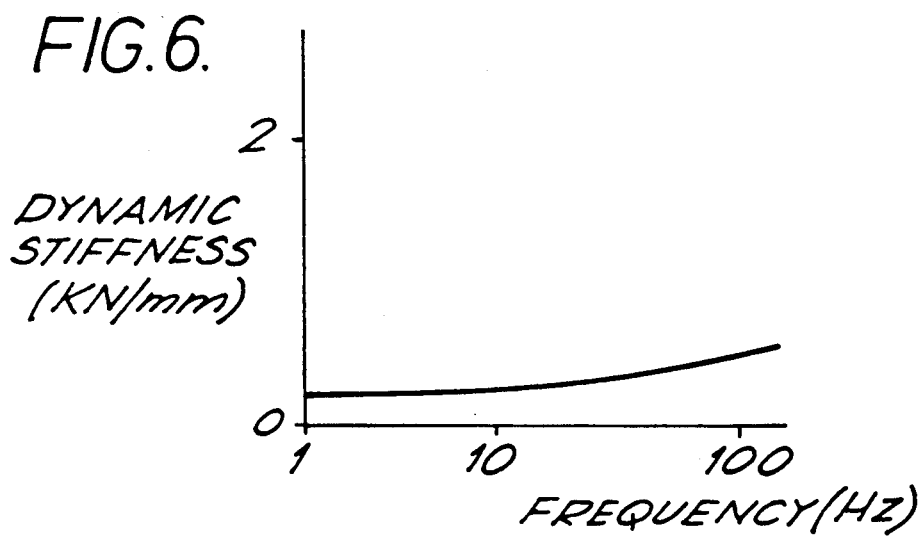
FIG. 6 is a showing of the dynamic stiffness/frequency characteristic of a device in accordance with the present invention.

The essence of the embodiments of the present invention as hereinbefore described is that the reinforcements, be they integrally or separately formed, are arranged so as to constrain the elastomer body to deform by means of periodic bulging deformations which contribute together to a non-linear static force/deflection behavior of specific type, as shown schematically in FIG. 5. The local bulging between reinforcements comprises a local buckling instability, with the overall generally conical design ensuring that the device overall is intrinsically stable at its design load F.

The device of the present invention is particulary well suited to such applications as (a) primary or secondary suspensions for road vehicles, (b) mounting of sensitive electronic equipment in vehicles such as aircraft and space vehicles, and (c) other general suspension applications. In application to vehicle suspensions, for example, the present invention provides a device having a non-linear spring function such that the normal weight of the vehicle is supported in the plateau region of the non-linear force deflection curve, shown in FIG. 5. It is furthermore essential to the practical functioning of the device in vehicle suspension applications that the design and materials employed incorporate sufficient damping to prevent unacceptable resonances at input frequencies likely to occur while the vehicle is in motion. The device of the invention provides attenuation of vibrations occurring from various sources passing into the vehicle body while it is in motion, and it is essential to this function that the dynamic properties of the device be well defined.

Figure 7:
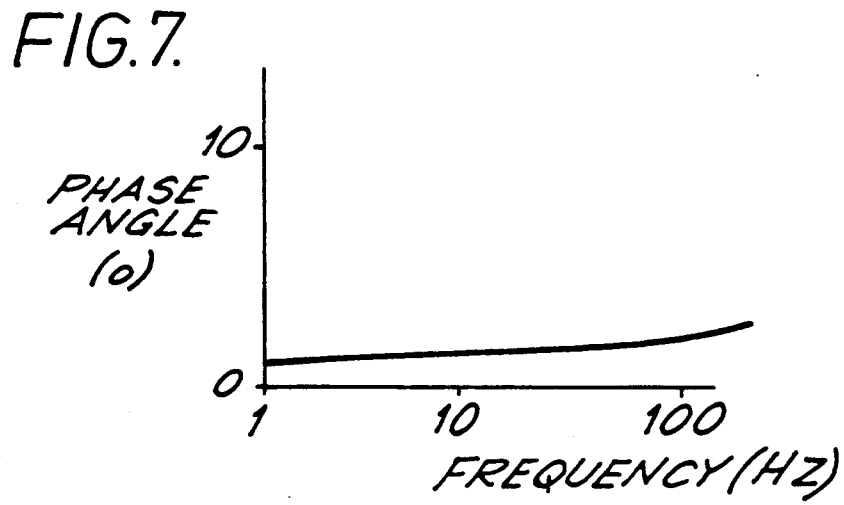
FIG. 7 illustrates the variation of the phase change of a dynamic input transmitted through an elastomeric spring as a function of dynamic frequency.
Figure 8:
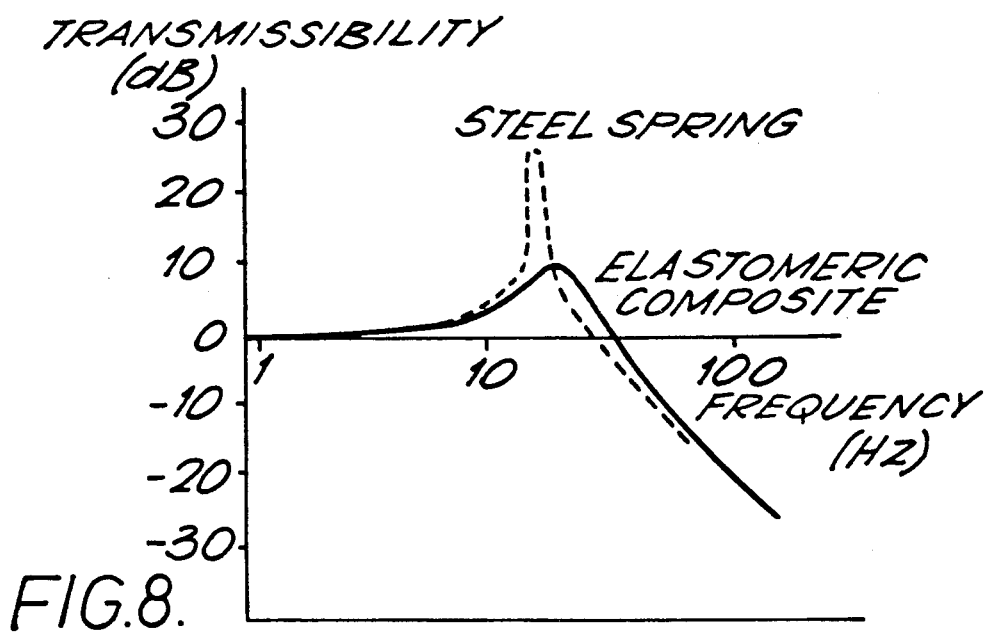
FIG. 8 illustrates the transmissibility of dynamic inputs through an elastomeric spring in accordance with the invention.
Figure 9:
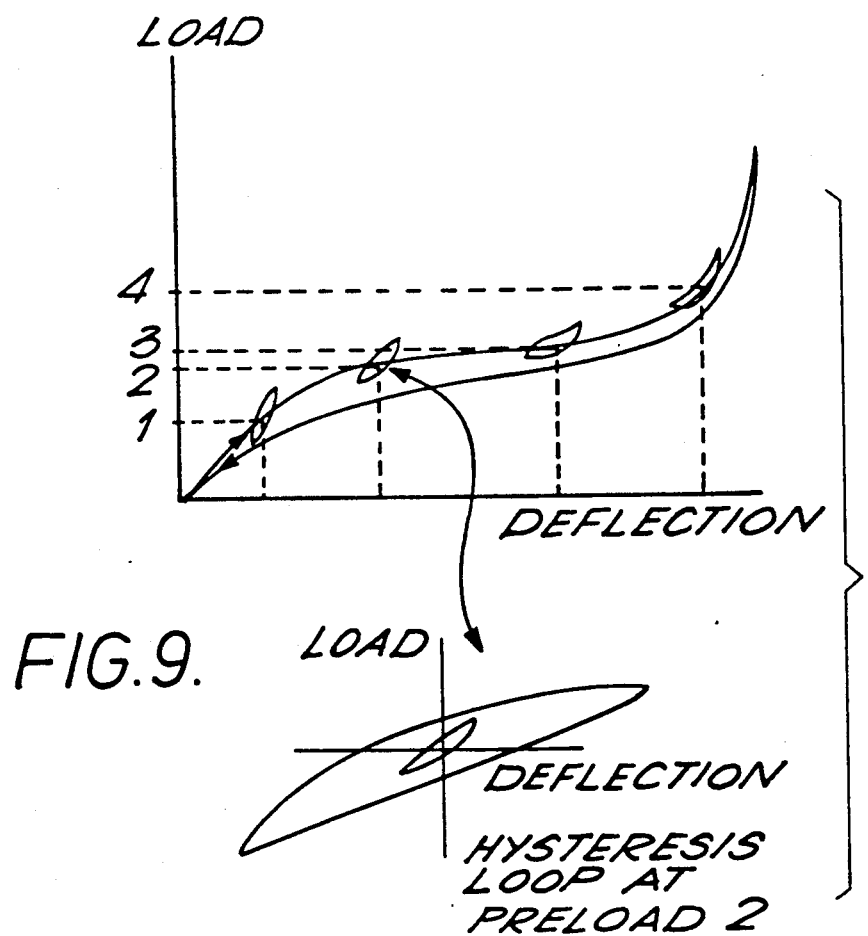
FIG. 9 illustrates the dynamic behavior of a spring in accordance with the invention under varying load conditions.

Dynamic properties are normally defined by means of dynamic stiffness (see FIG. 5) (the real part of the complex modulus) and phase angle (FIG. 7) (describing phase lag between in phase and out of phase components). This behavior can be usefully summarized by means of transmissibility (FIG. 8). Each of these parameters is defined as a function of frequency. The frequency of input vibrations can vary in practice over the range 0.1 to 500 Hz. The amplitude of the vibrational input will be smaller at higher frequencies. The device thus also needs to be characterized as a function of amplitude since dynamic stiffness and phase angle can vary with amplitude, even at the same frequency. Dynamic behavior can also be represented as hysterisis loops. FIG. 9 illustrates the desired behavior at different static preload levels of the device.

It is an advantageous feature of the invention that the device enables the following features to be provided in one unit:
1. static force deflection behavior to enable a vehicle body to be supported at the correct height;
2. intrinsic overall stability at the design load;
3. non-linear force/deflection behavior to provide improved ride characteristics, namely low stiffness under normal steady conditions and increasing stiffness with increasing load under extreme conditions such as fast cornering or hard braking of the vehicle;
4. correct dynamic stiffness at the appropriate static preload and service frequency and amplitude to give the desired natural frequency and hence desired vibration isolation characteristics; and
5. sufficient damping from the elastomeric phase to avoid the need for external hydraulic or other damping systems, though damping may be enhanced by such means despite the fact that the composite design will provide a good initial level of damping.

Figure 10:
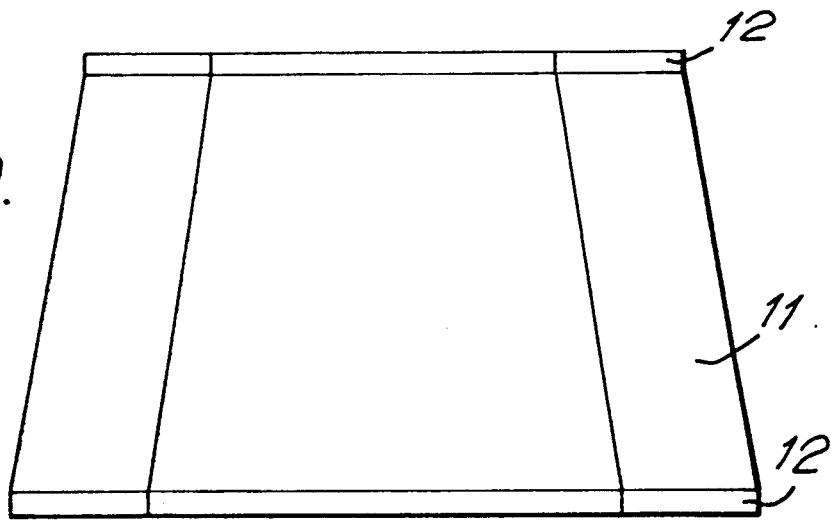
FIG. 10 and FIG. 11 show schematic sectional side elevation views of further exemplary elastomer spring elements in accordance with the present invention.
Figure 11:
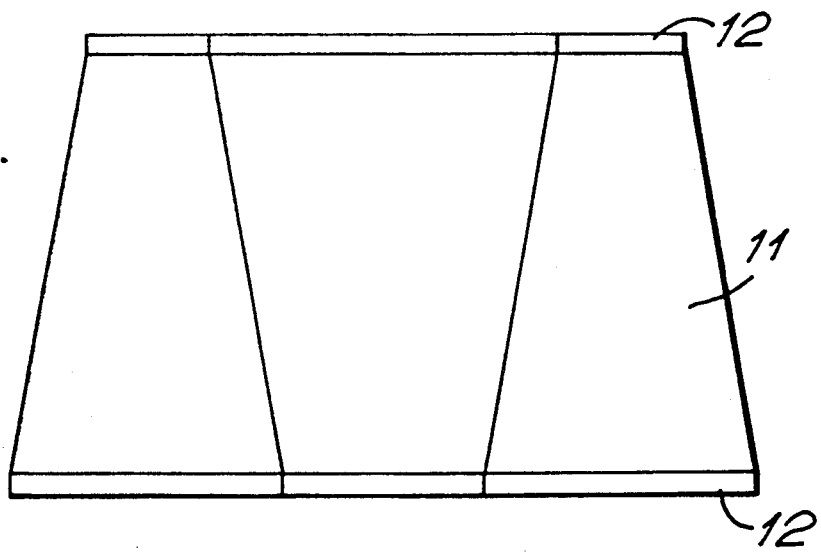
Figure 12:
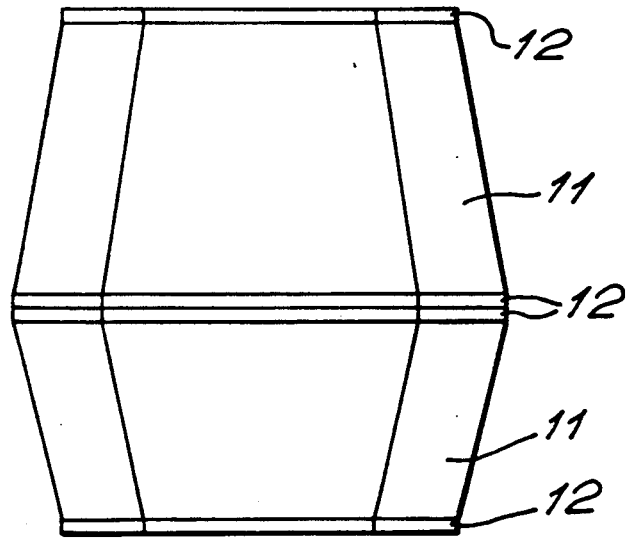
FIG. 12 is a schematic sectional side elevational showing of how two elastomer spring elements as shown in FIG. 10 might be assembled together to form a composite element.

As shown in FIGS. 10, 11 and 12 hollow annular frusto-conical elastomeric elements 1, having cone angles between 2° and 28° and preferably between 5° and 15° and with well defined outside and inside diameter to height ratios, can be bonded, by hot bonding techniques effected during vulcanization of the elastomer to ensure durable bonding, to annular reinforcing rings 12 formed as simple flat metal pressings, and the resulting spring elements can be combined together to form a composite spring. FIG. 12 shows a two-element composite spring formed by two different frusto-conical elastomer spring elements mounted base-to-base, one element, for example, being a low damping element for normal ride control in a vehicle application, and the other being a high damping element to provide higher damping for larger deflections caused by bumps, potholes, cornering and braking. Other composite assemblies are possible, for example, of different diameter frusto-conical elements defining a generally conically shaped composite assembly, though from mechanical stability and other considerations the number of spring elements in any composite assembly preferably should not exceed ten. As shown by FIGS. 10 and 11 and indeed by the two separate spring elements of FIG. 12, spring elements within the ambit of the invention can have different internal and external cone angles, different internal and external diameters at the top and bottom of their frusto-conical section, and different heights, and furthermore can be formed either of the same or of different elastomer materials or blends of elastomer materials having different stiffness and damping properties.

Figure 13:
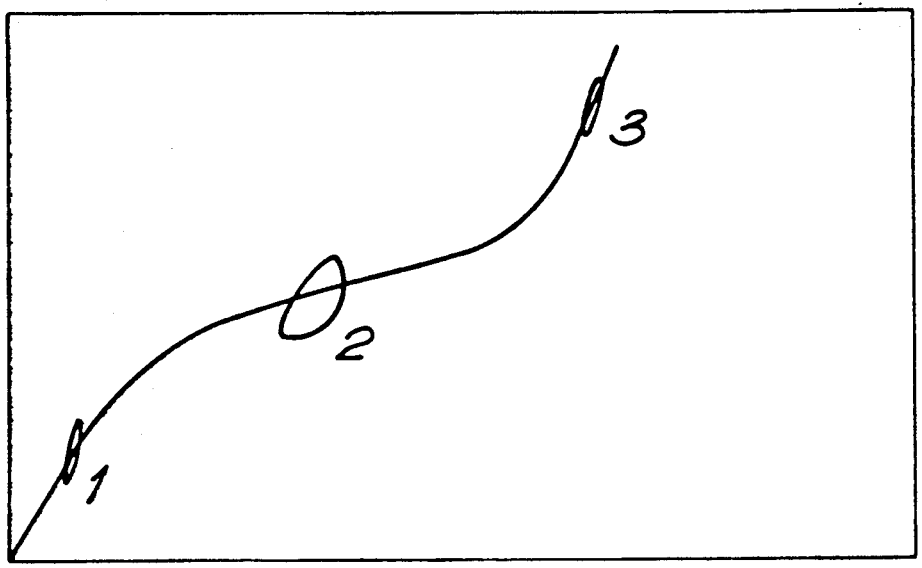
FIG. 13 is a exemplary load/deflection curve for an elastomeric spring showing enhanced geometric damping in its plateau region.
Figure 14:
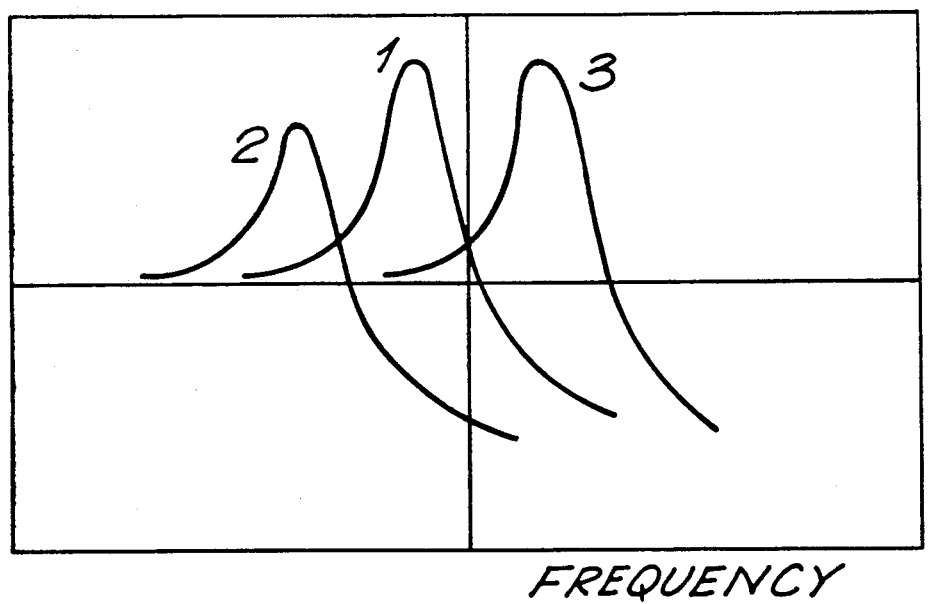
FIG. 14 shows a set of transmissibility curves corresponding to the locations 1, 2 and 3 identified in FIG. 13.

By virtue of the present invention, a composite elastomer spring device can have a force deflection plateau with so-called geometric damping, that is to say enhanced damping for those conditions where damping is needed. The difference in damping achieved at different stages of the force/deflection curve can, by virtue of this effect, be adjusted by design to suit any specific application. FIG. 13 illustrates a force/deflection curve having superimposed thereon at the locations 1, 2 and 3 indicated hysteresis loops from typical dynamic tests, and it can be seen that a larger hysteresis loop is obtained in the plateau region 2 of the force deflection curve indicating greater damping (i.e., a higher loss angle). FIG. 14 shows a set of transmissibility curves corresponding to the locations designated 1, 2 and 3 in FIG. 13 and it can be seen that the plateau region 2 where damping is greatest has the lowest peak in its transmissibility curve. A reduction in natural frequency is achieved at the plateau region (point 2 of the force/deflection curve) without the disadvantage of a large static deflection, and an increase in damping is also achieved without the disadvantage of an increase in stiffness or required modification of the elastomer compound.

Figure 15:
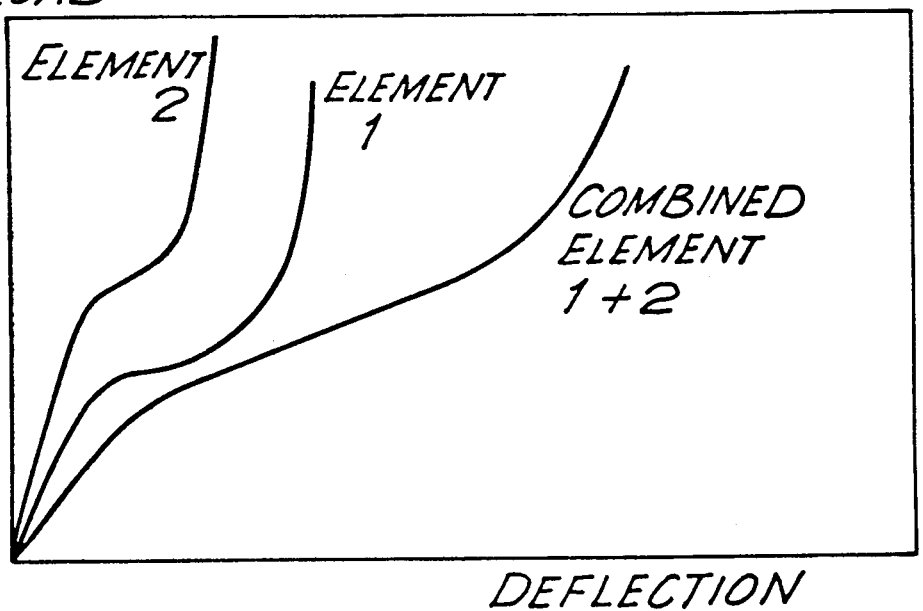
FIG. 15 shows exemplary load/deflection curves for two elastomer spring elements and shows the resultant curve obtained by combining the two elements.
Figure 16:
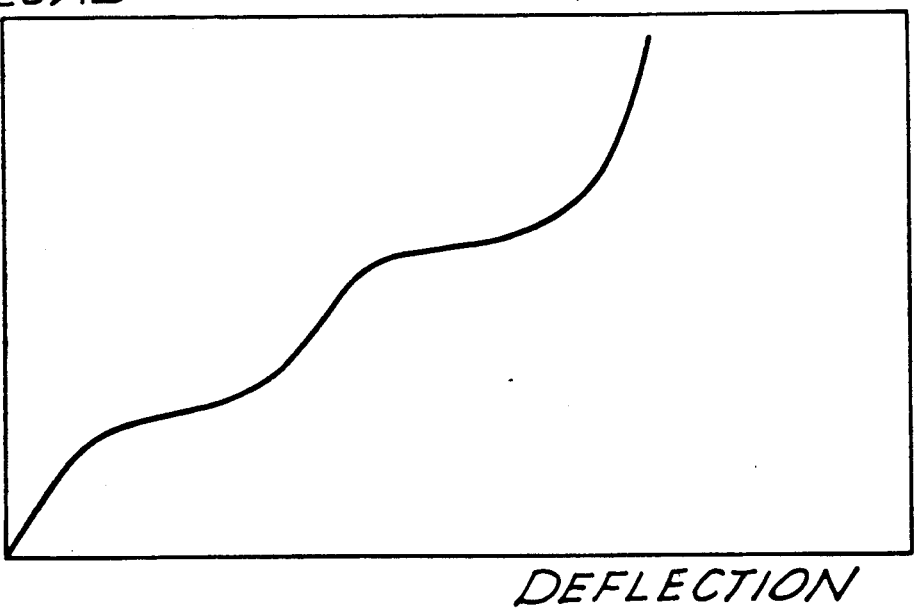
FIG. 16 shows how multiple plateaux may be achieved in a force/deflection curve by judicious selection of elastomer characteristics for different elements of a multi-element elastomer spring according to the present invention.

Referring to FIGS. 15 and 16, it can be seen that elastomer spring elements can be combined into a composite elastomeric spring having not only a single continuous force/deflection curve as in FIG. 13 with a single plateau region, but also so as to give multiple plateaua regions. FIG. 15 shows how individual elastomer spring elements having different force/deflection characteristics can be combined into a composite spring having force/deflection characteristics which are the aggregate of those of its components, and it can be seen from FIG. 16 that by addition of further components of greater stiffness a further plateau in the force/deflection characteristics can be achieved. By virtue of such combination of different spring elements producing differential damping, and plural plateaus in different regions of the force/deflection curve of the overall spring, vehicle applications for example requiring enhanced damping at different vehicle loadings can readily be accommodated. Thus, for example, the suspension of an automobile can be predetermined to provide optimum ride conditions irrespective of whether only the driver is present in the vehicle or whether there are one, two, or more passengers.

Figure 17:
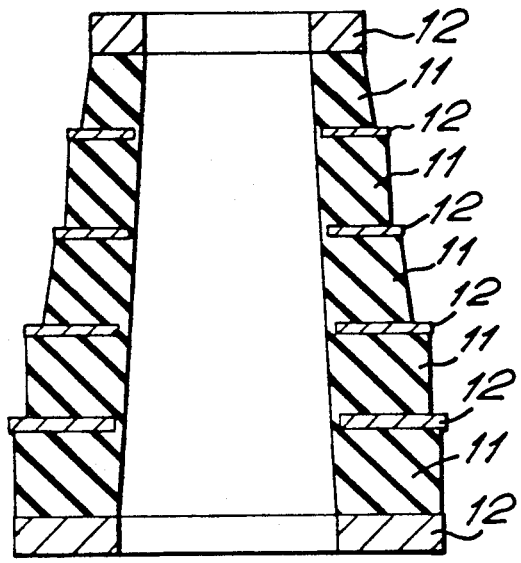
FIG. 17 and 18 show in schematic sectional side elevation view two multi-element elastomer springs each molded all in one piece.
Figure 18:
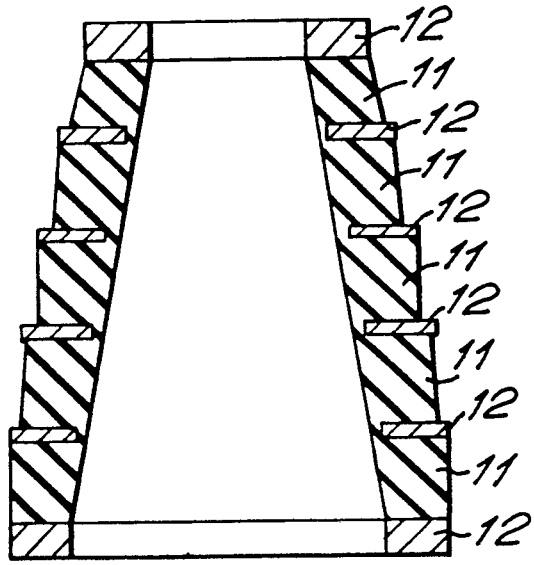

Whereas the elastomer springs of FIGS. 10, 11 and 12 as described hereinabove comprise separate elements combined together into a composite spring construction, the present invention has wider application and embraces composite elastomer springs that are integrally moulded, either of a single elastomer material throughout or of various different elastomer materials selected to provide specific characteristics as explained above. FIGS. 17 and 18 of the drawings shown exemplary arrangements of unitarily molded composite elastomer springs in accordance with the present invention, the spring of FIG. 17 having varying wall thickness throughout the stack of elemental springs, and the spring of FIG. 18 exhibiting uniform wall thickness. Molding techniques are available whereby, by use of molding dies having multiple injection parts and by control of elastomer flow within the mold, different elastomer materials or blends thereof can be molded at different parts of the composite spring. As indicated by legend in the drawing, the elastomer material would preferably be molded around the reinforcing rings for corrosion protection purposes if metal rings were used. Notable in FIGS. 17 and 18 is the use of thicker rings at the top and bottom extremities of the springs; such thicker rings will, as a practical matter, be formed with screw-threaded bolt holes, screw-threaded studs or other fixation means enabling attachment of the spring as required.

Figure 19A:
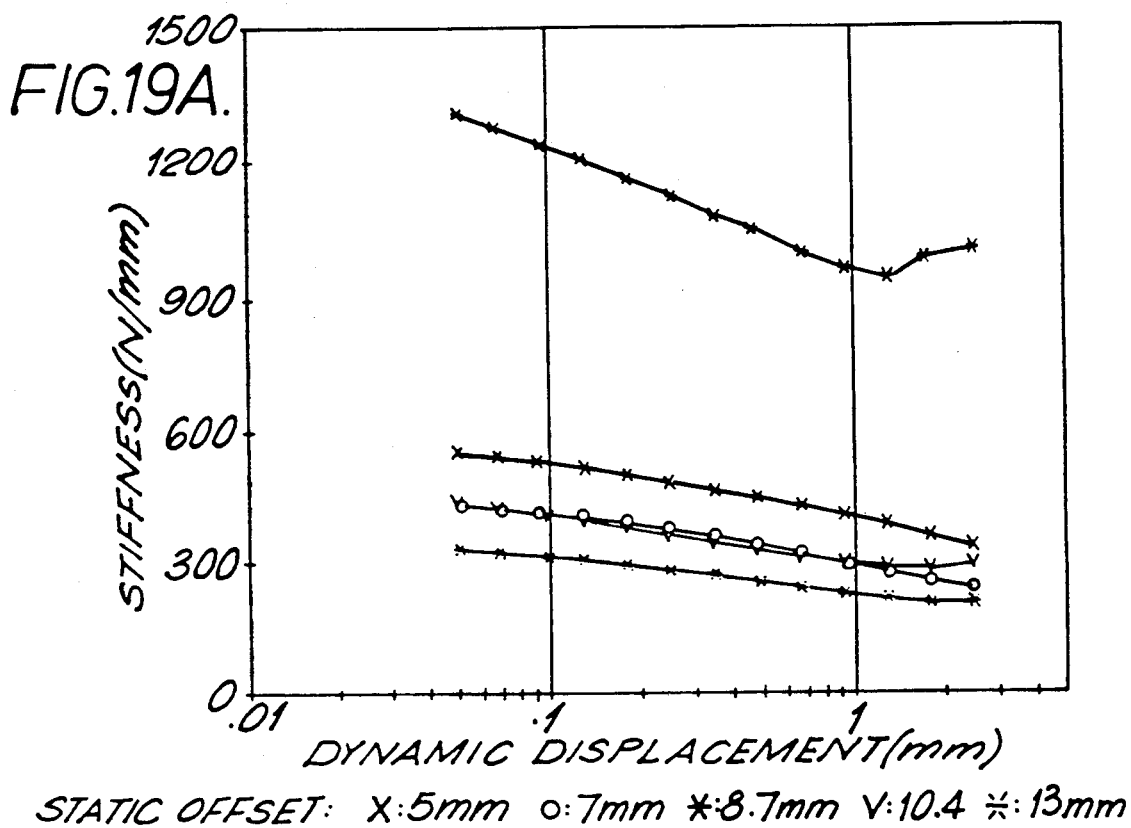
FIG. 19a–b shows changes in stiffness and damping with increasing amplitude at different static offsets for one version of combined elastomer spring elements in accordance with the present invention.
Figure 19B:
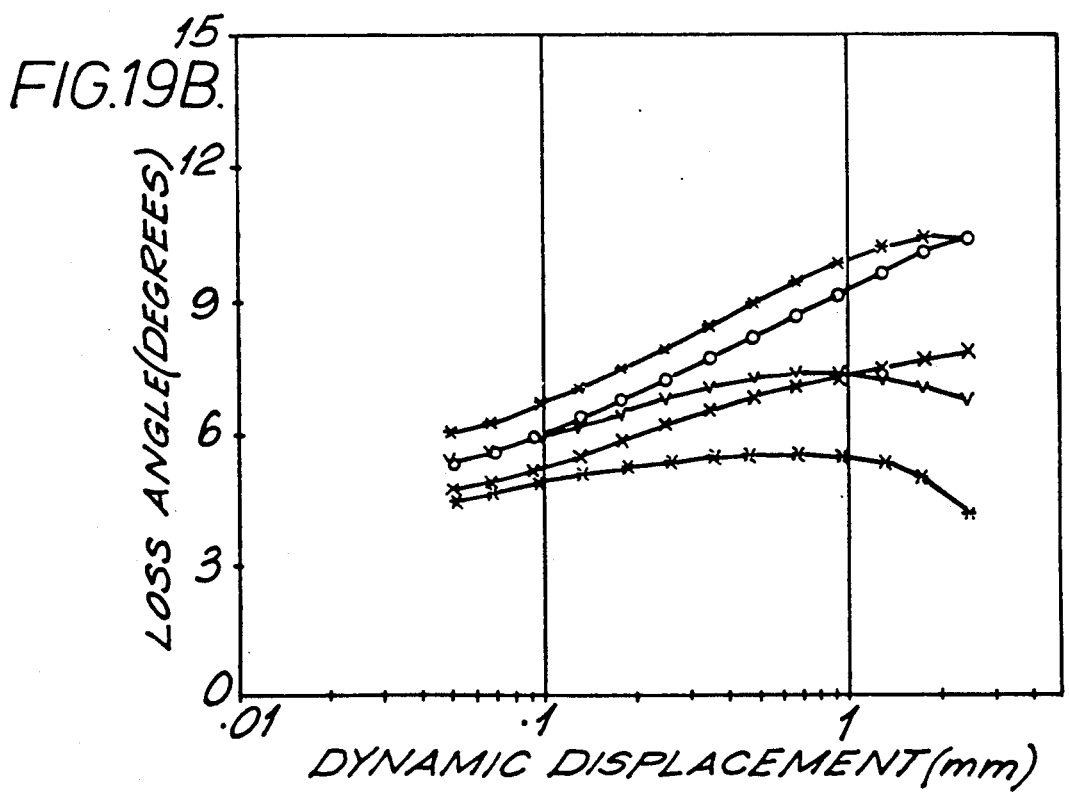

FIG. 19 shows how the stiffness and damping of an exemplary composite elastomer spring in accordance with the present invention might vary with increasing amplitude of dynamic displacement at different static offsets. As can be seen, as the amplitude of a vibration is increased, the stiffness and damping can change by design. High frequency road inputs, for example, are low amplitude when stiffness is higher. Large amplitudes may be associated with lower stiffness and higher damping. By virtue of the present invention, these effects can be accommodated much more readily than heretofore, thanks to the geometric damping effect and the use of different elastomers as composites combined in series or in parallel. The stiffness with amplitude trend can even be reversed so that stiffness increases with amplitude, which in vehicle applications can have some advantages in control over rough road surfaces.

Figure 20:
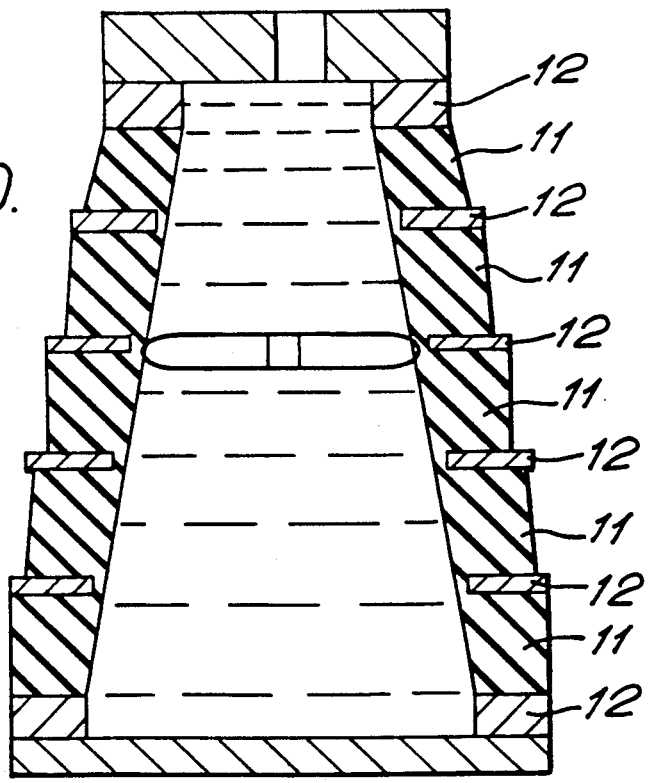
FIG. 20 schematically illustrates application of the invention to an active suspension system.

Spring elements constructed in accordance with the present invention can be designed specifically for use in active or semi-active suspension systems where the damping or spring rate can be modified under electronic or computer control via changes in internal pressure, for example of a pressurizing fluid such as ethylene or propylene glycol or the like. FIG. 20 illustrates schematically one way in which this might be achieved by virtue of the internal cavity of the spring being closed at each end, by virtue of an inlet/exhaust port being provided at one end for transfer of fluid under pressure to or from the spring cavity, and by the optional provision of an internal diaphragm to provide added damping at high amplitudes. Active control may also be achieved simply by the addition of force to increase the offset of the non-linear spring, even without a pressurized fluid filling in the spring cavity. This could give a two-stage system that could either adapt automatically to an increase in load or could be changed from "soft ride" to "hard ride" by the flick of a switch on the vehicle dashboard. Such a system would be advantageous in truck suspensions, for example to enable ready adjustment to be made for laden and unladen weight.

As will be appreciated from the foregoing, the present invention aims to exploit the intrinsic non-linearity of elastomer materials over their working range in the development of advanced anti-vibration devices having particularly advantageous application to vehicle suspension systems. The invention utilizes geometric damping to enhance the normal damping properties of the elastomer material under specific conditions depending upon the mode and extent of deformation. In application to road vehicles, the spring elements of the present invention provide static and dynamic force deflection and dynamic behavior which adapts to the conditions of loading and road inputs. This approach is adaptive rather than active and so avoids the need for high pressure hydraulic power requirements. The intrinsic non-linear behavior will cause the system to harden continuously when lateral or braking forces rise above a predefined level. The system then automatically softens when these forces are removed (e.g., braking or cornering maneuver complete). As the amplitude of dynamic road inputs increases, the damping can be designed to increase. Thus static force/deflection dynamic stiffness and damping behavior adapt to the nature of loading conditions. This increases the complexity of initial design and materials property characterizations required. However, once the correct spring design and properties are identified, then the result is achieved with a simple molding of a single component that can be inexpensively produced on a mass production scale.

As regards the application of the invention to active suspension systems as mentioned above, the function of any vehicle suspension system is to minimize the transmission of vertical movement from the wheel arising from irregularities of road surfaces. Conventional passive systems (steel spring and hydraulic damper) offer only fixed characteristics which are usually a compromise between ride comfort and handling over different frequency and amplitude conditions. No single optimum setting of a conventional damper can satisfy all requirements of vehicle handling and ride comfort. There is currently considerable interest in developing new concepts for vehicle suspension with variable dampers that can overcome the constraints imposed by this conventional system. Some concepts have been implemented in prototype or high performance vehicles. Full active suspension control offers high performance control of lateral and vertical dynamics separately. This however requires four hydraulic actuators and a control box with feedback control which consumes large amounts of power to overcome isolation inability. Without high cylinder pressures, satisfactory control becomes difficult with high frequency or amplitude road disturbances. High performance is likely to be costly, require heavy duty equipment and pase long term maintenance problems.

The semi-active suspension has addressed the power consumption problem by using a controllable damper only. This has the possibility of offering a practical system with performance improvements. Use of hydraulics alone for damping will have performance limitations, especially with regard to isolation functions. Road preview has been suggested as a way of improving performance. The elastomeric components proposed by the present invention offer different possibilities in the context of a semi-active suspension system. Both stiffness and damping could be adapted under electronic control using relatively low internal hydrostatic pressures to adjust both stiffness and damping superimposed on the underlying non-linear and intrinsically adaptive spring behavior. There is the added safety feature of reverting to failsafe passive performance levels in the event of failure of the active part of the system.

Properly designed elastomeric components can provide extremely safe and reliable structural components. Structural bearings for offshore oil platforms, for example, have been successfully used as primary load bearing elements supporting 3000 tons for a minimum working life of 30 years. Elastomers are also widely used as secondary suspension components in automobiles, and have been used as primary suspension elements for some trucks, Formula One racing cars and project Thrust, the current land speed record holder. Intrinsic to safety is a failsafe approach to design using shear and compression modes to ensure that full working loads will still be supported even in the unlikely event of some crack growth or damage. Elastomeric components have proven fatigue life and creep resistance in this type of application. Tires themselves are elastomeric composite structures exposed to much more severe conditions than suspension components. In a semi-active system, the wall thickness of elastomer could continue as a safe passive spring/damper even in the event of complete failure of the active part of the system.

The present invention is seen as having the following distinct advantages, namely:
  i. Primary spring and damper in one molded component
  ii. Adaptive suspension to road input with no mechanical moving parts
  iii. Non-linear spring element
  iv. Tuneable properties over a wide range of spring rates and damping
  v. Suitability for use in semi-active suspension system
  vi. Performance handling advantages over large amplitude road inputs, hard braking and fast cornering
  vii. Weight saving and cost saving.

We claim:
1. An elastomeric compression spring exhibiting overall stability and predetermined force/deflection characteristics under compressive loading, said spring comprising:
  (a) an elongate tubular elastomer body having first and second planar load-bearing ends, said first end having a lesser cross-section than the second end and the second end having a greater cross-section than the first end, and the cross-section of the elastomer body increasing progressively between said first and second ends;
  (b) a plurality of discrete annular reinforcements provided at longitudinally spaced-apart locations of said elastomer body so as to divide the elastomer body into a plurality of sections having different dimensional characteristics;
  (c) each of said sections defining a site for a local bulging instability of the elastomer body when under compressive load; and
  (d) by virtue of said sections having different dimensional characteristics, said local bulging instabilities being developed progressively throughout said sites as said elastomer body is compressed;

(e) the different characteristics of said sections being selected so that the effect of the progressive development of said local bulging instabilities under compressive loading of the spring is such that the spring has a non-linear force/deflection characteristic exhibiting at least one plateau region between first and second higher stiffness regions;

(f) said plateau region providing lower static and dynamic stiffness over an extended deflection range at a predetermined compressive loading of the spring.

2. A spring as claimed in claim 1 wherein the elastomer body has a generally frusto-conical shape.

3. A spring as claimed in claim 2, wherein said elastomer body has a wall thickness which is generally constant throughout a lenght of the body.

4. A spring as claimed in claim 2, wherein said elastomer body has a wall thickness which varies from a first end thereof to a second end thereof.

5. A spring as claimed in claim 1, wherein said reinforcements comprise reinforcing ribs of elastomeric material.

6. A spring as claimed in claim 5, wherein said reinforcing ribs are formed integrally with the elastomer body and of the same elastomeric material.

7. A spring as claimed in claim 5, wherein said reinforcing ribs are on an exterior of said elastomer body.

8. A spring as claimed in claim 1, wherein said reinforcements comprise reinforcing elements of metal.

9. A spring as claimed in claim 1, wherein said reinforcements comprise reinforcing elements of at least partly rigid plastic material.

10. A spring as claimed in claim 1, wherein said reinforcements are on an exterior of said elastomer body.

11. A spring as claimed in claim 1, wherein said reinforcements are embedded in said elastomer body.

12. A spring as claimed in claim 1, wherein said elastomer body is formed of a composite elastomer material exhibiting multi-phased behaviour under compression load conditions.

13. A spring as claimed in claim 1, wherein the elastomeric material of the spring incorporates magnetic material enabling dynamic properties of the spring to be adjusted by magnetic means.

14. A spring as claimed in claim 1, including means incorporated within an interior of the elastomer body for adjusting dynamic properties of the spring.

15. A spring as claimed in claim 14, wherein said dynamic properties adjustment means comprises active fluid damping components.

16. A compression spring as claimed in claim 1, utilized as a vehicle suspension spring, and wherein an static loading of the spring is predetermined so as to occur in the plateau region of the force-deflection characteristic of the spring.

17. A spring as claimed in claim 1 and formed as a plurality of individual spring elements bonded together.

18. A spring as claimed in claim 17, wherein each of said individual spring elements comprises a frucstoconical elastomer body having annular reinforcing rings bonded thereto at each axial end thereof.

19. A spring as claimed in claim 17, wherein said plurality of individual spring elements includes elements formed of different elastomeric materials having different forces, deflection characteristics selected to contribute to the overall non-linear force deflection characteristic of the spring.

20. An elastomeric compression spring exhibiting overall stability and predetermined force/deflection characteristics under compressive loading, said spring comprising:

(a) a plurality of hollow frusto-conical elastomer bodies having planar load-bearing end faces; and (b) a plurality of annular reinforcing elements;

(c) said plurality of elastomer bodies and said plurality of annular reinforcing elements being combined together, one of said reinforcing elements being bonded to each end of each said elastomer body, so as to form a unitary spring structure;

(d) said unitary spring structure being assembled to exhibit overall stability under axial compressive loading, with each of said frusto-conical elastomer bodies defining a site for a local bulging instability, and said frusto-conical elastomer bodies having different force/deflection characteristics whereby under compressive axial loading said local bulging instabilities develop progressively throughout said sites;

(e) the different force/deflection characteristics of said frusto-conical elastomer bodies being selected such that the effect of the axial compressive loading of the spring is such that the spring has a non-linear force/deflection characteristic exhibiting at least one plateau region between first and second higher stiffness regions, said plateau region providing lower static and dynamic stiffness over an extended deflection range at a predetermined compressive loading of the spring.

21. A spring as claimed in claim 20, wherein different ones of said frusto-conical elastomer bodies are formed of different elastomer materials having different stiffness and damping properties.

22. A spring as claimed in claim 21, wherein said different elastomer materials are selected to provide a plurality of plateaus in said plateau region.

23. A spring as claimed in claim 20, wherein said plurality of frusto-conical elastomer bodies have cone angles between 2° to 28°.

24. A spring as claimed in claim 20, wherein said plurality of elastomer bodies, each bonded to one of said reinforcing elements at each of its ends, are combined together serially end to end.

25. A spring as claimed in claim 20, wherein said frusto-conical elastomer bodies have different internal and external cone angles.

26. A spring as claimed in claim 20, wherein said frusto-conical elastomer bodies have different internal and external diameters at a top and a bottom of their frusto-conical section.

27. A spring as claimed in claim 20, wherein different ones of said frusto-conical elastomer bodies have different heights between their planar end faces, different elastomer materials having different stiffness and damping properties.

28. A spring as claimed in claim 20 utilized as a vehicle suspension spring and wherein the static loading of the spring is predetermined so as to occur in the plateau region of the force deflection characteristic of the spring.

29. An elastomeric vehicle suspension compression spring exhibiting overall stability and predetermined force/deflection characteristics under compressive loading, said spring comprising:

(a) an elongate tubular elastomer body having first and second planar load-bearing ends, said first end having a lesser cross-section than the second end and the second end having a greater cross-section than the first end, and the cross-section of the elastomer body increasing progressively between said first and second ends;

(b) a plurality of discrete annular reinforcements provided at longitudinally spaced-apart locations of said elastomer body so as to divide the elastomer body into a plurality of sections having different dimensional characteristics;

(c) each of said sections defining a site for a local bulging instability of the elastomer body when under compressive load; and (d) by virtue of said sections having different dimensional characteristics, said local bulging instabilities being developed progressively throughout said sites as said elastomer body is compressed;

(e) the different characteristics of said sections being selected so that the effect of the progressive development of said local bulging instabilities under compressive loading of the spring is such that the spring has a non-linear force/deflection characteristic exhibiting at least one plateau region between first and second higher stiffness regions;

(f) said plateau region providing lower static and dynamic stiffness over an extended deflection range at a predetermined compressive loading of the spring;

(g) static loading of said spring being predetermined so as to occur in said plateau region.

30. An elastomeric compression spring exhibiting overall stability and predetermined force/deflection characteristics under compressive loading, said spring comprising:

(a) an elongate tubular elastomer body having first and second planar load-bearing ends, said first end having a lesser cross-section than the second end and the second end having a greater cross-section than the first end, and the cross-section of the elastomer body increasing progressively between said first and second ends;

(b) a plurality of discrete annular reinforcements provided at longitudinally spaced-apart locations of said elastomer body so as to divide the elastomer body into a plurality of sections having different dimensional characteristics;

(c) each of said sections defining a site for a local bulging instability of the elastomer body when under compressive load; and (d) by virtue of said sections having different dimensional characteristics, said local bulging instabilities being developed progressively throughout said sites as said elastomer body is compressed;

(e) the different characteristics of said sections being selected so that the effect of the progressive development of said local bulging instabilities under compressive loading of the spring is such that the spring has a non-linear force/deflection characteristic exhibiting at least one plateau region between first and second higher stiffness regions;

(f) said plateau region providing lower static and dynamic stiffness over an extended deflection range at a predetermined compressive loading of the spring;

(g) said spring further comprising active fluid damping components within an interior of said elastomer body.

31. An elastomeric vehicle suspension compression spring exhibiting overall stability and predetermined force/deflection characteristics under compressive loading, said spring comprising:

(a) a plurality of hollow frusto-conical elastomer bodies having planar load-bearing end faces; and (b) a plurality of annular reinforcing elements;

(c) said plurality of elastomer bodies and said plurality of annular reinforcing elements being combined together, one of said reinforcing elements being bonded to each end of each said elastomer body, so as to form a unitary spring structure;

(d) said unitary spring structure being assembled to exhibit overall stability under axial compressive loading, with each of said frusto-conical elastomer bodies defining a site for a local bulging instability, and said frusto-conical elastomer bodies having different force/deflection characteristics whereby under compressive axial loading said local bulging instabilities develop progressively throughout said sites;

(e) the different force/deflection characteristics of said frusto-conical elastomer bodies being selected such that the effect of the axial compressive loading of the spring is such that the spring has a non-linear force/deflection characteristic exhibiting at least one plateau region between first and second higher stiffness regions, said plateau region providing lower static and dynamic stiffness over an extended deflection range at a predetermined compressive loading of the spring, static loading of said spring being predetermined so as to occur in said plateau region.

32. An elastomeric compression spring exhibiting overall stability and predetermined force/deflection characteristics under compressive loading, said spring comprising:

(a) a plurality of hollow frusto-conical elastomer bodies having planar load-bearing end faces; and (b) a plurality of annular reinforcing elements;

(c) said plurality of elastomer bodies and said plurality of annular reinforcing elements being combined together, one of said reinforcing elements being bonded to each end of each said elastomer body, so as to form a unitary spring structure;

(d) said unitary spring structure being assembled to exhibit overall stability under axial compressive loading, with each of said frusto-conical elastomer bodies defining a site for a local bulging instability, and said frusto-conical elastomer bodies having different force/deflection characteristics whereby under compressive axial loading said local bulging instabilities develop progressively throughout said sites;

(e) the different force/deflection characteristics of said frusto-conical elastomer bodies being selected such that the effect of the axial compressive loading of the spring is such that the spring has a non-linear force/deflection characteristic exhibiting at least one plateau region between first and second higher stiffness regions, said plateau region providing lower static and dynamic stiffness over an extended deflection range at a predetermined compressive loading of the spring;

(f) different ones of said frusto-conical elastomer bodies being formed of different elastomer materials having different stiffness and damping properties selected to provide a plurality of plateaus in said plateau region.

* * * * *